(No Model.)
J. J. & W. H. GIESLER.
COAT ADJUSTER.
No. 469,134. Patented Feb. 16, 1892.
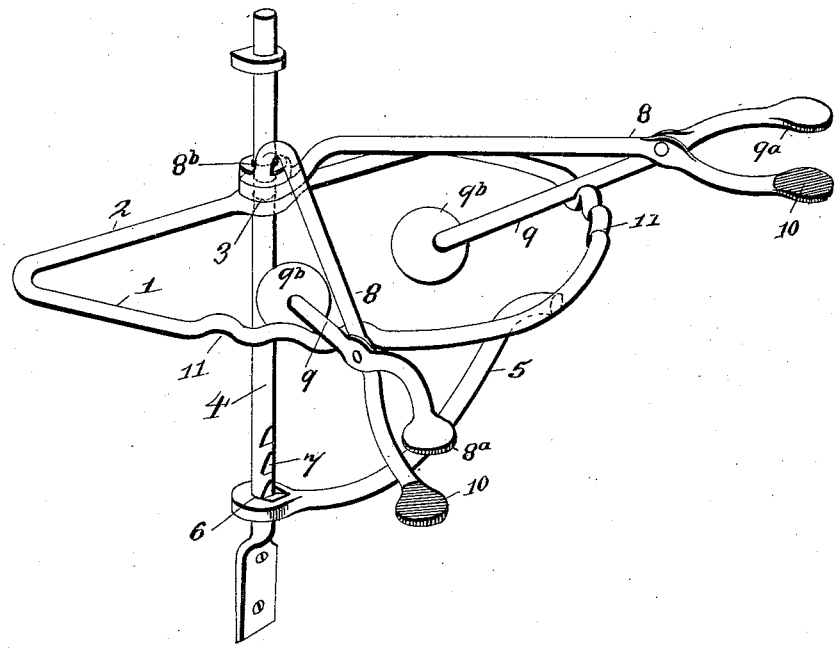
Witnesses
C. H. Raeder,
J. F. Reily
J. J. Giesler
Wm. H. Giesler
Inventors:
By his Attorneys W. T. Fitzgerald & Co.

UNITED STATES PATENT OFFICE.

JACOB J. GIESLER AND WILLIAM H. GIESLER, OF MEADOW VIEW, VIRGINIA.

COAT-ADJUSTER.

SPECIFICATION forming part of Letters Patent No. 469,134, dated February 16, 1892.

Application filed April 22, 1891. Serial No. 390,010. (No model.)

*To all whom it may concern:*

Be it known that we, JACOB J. GIESLER and WILLIAM H. GIESLER, citizens of the United States, residing at Meadow View, in the county of Washington and State of Virginia, have invented certain new and useful Improvements in Coat-Jacks; and we do hereby declare the following to be a full, clear, and exact description of the invention, such as will enable others skilled in the art to which it appertains to make and use the same.

Our invention consists in a new and improved coat-jack or device for automatically assisting the wearer in putting on or removing an overcoat or other coat; and the invention will be hereinafter fully described and claimed.

Referring to the accompanying drawing, the figure is a view in perspective of a coat-jack embodying my improvements.

The same numerals of reference indicate corresponding parts in the figure.

Referring to the several parts by their designating-numerals, 1 indicates a curved bar, which is formed, preferably, of a single rod bent into the semicircular form shown, the ends of the rod being connected together on a straight line 2 and being enlarged and formed with the aperture 3. Through this central aperture 3 passes a supporting-rod 4, the ends of which are suitably fastened to the wall at the point where it is desired to suspend the coat-jack. A curved brace 5 is secured at its upper end to the center of the curved bar 1, and its enlarged lower end is formed with the aperture 6, through which the supporting-rod 4 also passes. The forward side of the supporting-rod is formed with a series of notches 7, which construction admits of the coat-jack being raised or lowered to suit the height of the person about to use it. The clamping-arms 8 9 are pivoted together at the point where they intersect or cross each other, and the rear slightly-curved end of the upper arm 8 is extended back and formed with an aperture $8^b$, through which the supporting-rod 4 passes above the part 2. The inner end of the lower arm 9 is weighted, as shown at $9^b$, and it will be seen that this weighted inner end will normally hold the outer clamping ends of the two arms in an open position. The outer ends of the pivoted arms 8 9 are flattened and enlarged to form the clamping-jaws $8^a 9^a$, the inner sides of which are preferably lined with rubber pads 10 for the double purpose of affording a more secure grip on the coat and of preventing any injury or rubbing of the surface of the same. It will now be seen that if the collar of the coat is inserted between the clamping-jaws $8^a 9^a$ the weight of the coat itself as it pulls down upon the outer end of the arm 8 will thus, as it draws the upper arm down, (the aperture $8^b$ being sufficiently large to admit of this movement,) press the inner end of the lower arm 9 upon the top of the circle 1, and the outer ends of the two arms will thus be pressed together, firmly grasping the coat between their clamping-jaws. A pair of the clamping-arms are preferably used on each device, although four may be employed, if desired.

In use the collar or upper part of the coat is placed between the outer clamping-jaws of the pair of clamping-arms, and its weight closes the said jaws upon it, and the wearer can then easily draw his overcoat on by inserting his arms in the sleeve-holes, the device firmly holding the coat while he draws it on, and it will be seen that the more strain he puts upon the coat in pulling it on the more firmly will the clamping-jaws grip the same, rendering it impossible for the coat to slip out of the device while being drawn on by the wearer.

It will be found in use that the device acts with great sensitiveness, grasping the coat with increased firmness as a greater strain is put upon the same in drawing it on. The curved bar 1 is formed with a series of indentations or depressions 11, which permit of the clamping-arms being adjusted nearer together or farther apart on the curved-bar arm according to the size of the coat and of the wearer.

From the foregoing description, taken in connection with the accompanying drawing, the construction, method of operation, and practical advantages of our invention will be readily understood.

It will be seen that our new and improved coat-jack is very simple and durable in its construction, while it is exceedingly convenient and effective in use, operating automatically in assisting the wearer to put on or remove his overcoat.

Having thus described our invention, what we claim, and desire to secure by Letters Patent, is—

The combination of the fixed supporting-rod 4, formed with a series of notches 7, the frame 1 2, having the rear central aperture 3 and provided with a brace 5, having the apertured inner end, the clamping-arms 8, formed with the apertured inner ends 8$^b$ and the outer clamping-jaws 8$^a$, and the lower clamping-arms 9, pivoted to the upper clamping-arms and having the weighted inner ends and the clamping-jaws at their outer ends, substantially as set forth.

In testimony whereof we affix our signatures in presence of two witnesses.

JACOB J. GIESLER.
WILLIAM H. GIESLER.

Witnesses:
JOHN H. VAIL,
JACOB M. GIESLER.